(12) United States Patent
Biester et al.

(10) Patent No.: US 8,598,758 B2
(45) Date of Patent: Dec. 3, 2013

(54) ELECTRIC MOTOR AND POSITION HOLDING DEVICE FOR SUCH AN ELECTRIC MOTOR

(75) Inventors: Klaus Biester, Wienhausen (DE); Peter Kunow, Berlin (DE)

(73) Assignee: Cameron International Corporation, Houston, TX (US)

( * ) Notice: Subject to any disclaimer, the term of this patent is extended or adjusted under 35 U.S.C. 154(b) by 275 days.

(21) Appl. No.: 13/000,417

(22) PCT Filed: Jul. 16, 2009

(86) PCT No.: PCT/EP2009/005184
§ 371 (c)(1),
(2), (4) Date: Mar. 29, 2011

(87) PCT Pub. No.: WO2011/006518
PCT Pub. Date: Jan. 20, 2011

(65) Prior Publication Data
US 2011/0181141 A1    Jul. 28, 2011

(51) Int. Cl.
*H02K 49/00* (2006.01)
(52) U.S. Cl.
USPC .......................... 310/103; 310/181
(58) Field of Classification Search
USPC .................. 310/181, 154.02, 103, 68 B
See application file for complete search history.

(56) References Cited

U.S. PATENT DOCUMENTS

| | | | | |
|---|---|---|---|---|
| 3,671,841 | A * | 6/1972 | Hoffmann | 318/696 |
| 5,548,173 | A * | 8/1996 | Stephenson | 310/181 |
| 5,647,321 | A * | 7/1997 | Ichikawa et al. | 123/399 |
| 6,512,318 | B2 * | 1/2003 | Torok et al. | 310/181 |
| 7,868,505 | B2 * | 1/2011 | Yamashita | 310/181 |
| 2002/0047447 | A1 * | 4/2002 | Torok et al. | 310/181 |
| 2003/0189385 | A1 * | 10/2003 | Fujita | 310/181 |
| 2007/0296312 | A1 * | 12/2007 | Yasuda | 310/49 R |

FOREIGN PATENT DOCUMENTS

| | | |
|---|---|---|
| DE | 102007033676 A1 | 1/2009 |
| EP | 1070827 A2 | 1/2001 |
| WO | 9821807 A1 | 5/1998 |
| WO | 2008125136 A1 | 10/2008 |

OTHER PUBLICATIONS

PCT/EP2009/005184 International Search Report and Written Opinion, Apr. 7, 2010 (13 p.).

* cited by examiner

*Primary Examiner* — Thanh Lam
(74) *Attorney, Agent, or Firm* — Chamberlain Hrdlicka

(57) ABSTRACT

An electric motor, particularly for an actuating device for displacing a control device, such as a valve, a gate valve, a blow-out preventer or the like, for use in oil or gas production includes a stator and a rotor assigned to a motor shaft, and a position holding device for exerting a holding torque on the motor shaft. To improve an electric motor of this type such that said motor is of a compact structure, includes less additional parts for a corresponding position holding device and, particularly in case of failure of an external power supply, reliably prevents a situation where the motor shaft is moved out of the attained position upon corresponding pressure application e.g. by the control device, the position holding device comprises a plurality of permanent magnets, the permanent magnets being arranged in radial direction relative to the rotor and the motor shaft, respectively.

14 Claims, 2 Drawing Sheets

ELECTRIC MOTOR AND POSITION HOLDING DEVICE FOR SUCH AN ELECTRIC MOTOR

CROSS-REFERENCE TO RELATED APPLICATIONS

This application is a 35 U.S.C. §371 national stage application of PCT/EP2009/005184 filed Jul. 16, 2009, incorporated herein by reference in its entireties for all purposes.

STATEMENT REGARDING FEDERALLY SPONSORED RESEARCH OR DEVELOPMENT

Not applicable.

BACKGROUND

The present invention relates to an electric motor, particularly for an actuating device for displacing a control device, such as a valve, a gate valve, a blow-out preventer, or the like, for use in oil and gas production, the electric motor comprising a stator and a rotor assigned to a motor shaft, as well as a position holding device for exerting a holding torque on the motor shaft. The present invention also relates directly to such a position holding device for an electric motor.

The electric motor is connected via the motor shaft, for example, to a screw nut of a thread drive so as to linearly displace a threaded spindle and to axially displace the control device accordingly via said spindle between an advanced position and a retracted position. The position holding device serves to hold a specific position of the motor shaft and thus of the threaded spindle and the control device, respectively, so that particularly the threaded spindle is prevented from returning automatically from a specific position.

Such an electric motor is e.g. described in WO 2008/125136. In this publication the position holding device is directly connected to the motor shaft of the electric motor. Owing to this direct connection, loop or volute springs need for instance no longer be arranged, which springs, on the one hand, allow for a rotation of the motor shaft and the threaded spindle, respectively, in one direction while on the other hand a return torque exerted e.g. by the control device is taken up by said spring.

The corresponding position holding device according to WO 2008/125136 is of an inexpensive and relatively simple construction, while a corresponding fault-proofness of the actuating device and the control device, respectively, is maintained at the same time.

The corresponding position holding device according to WO 2008/125136 is of an inexpensive and relatively simple construction, while a corresponding fault-proofness of the actuating device and the control device, respectively, is maintained at the same time.

SUMMARY

With respect to the already known electric motor, it is the object of the present invention to further improve such a motor in such a way that said motor is of a more compact construction, comprises less additional parts for a corresponding position holding device and, in particular in case of external power supply failure, reliably prevents the motor shaft from moving out of the attained position upon a corresponding pressure application by the control device, for example.

With respect to the already known electric motor, it is the object of the present invention to further improve such a motor in such a way that said motor is of a more compact construction, comprises less additional parts for a corresponding position holding device and, in particular in case of external power supply failure, reliably prevents the motor shaft from moving out of the attained position upon a corresponding pressure application by the control device, for example.

According to the invention the position holding device comprises, apart from the other parts of the electric motor, a plurality of permanent magnets and/or coils with or without a core material like iron for exerting a holding force or a holding torque on the rotor and the motor shaft, said permanent magnets and/or coils with or without a core material like iron being arranged in radial direction relative to the rotor and may be used in combination.

The position holding device is here predominantly part of the electric motor, so that no special constructional adaptations, or the like, are needed outside the electric motor. Furthermore, the arrangement of the corresponding permanent magnets and/or coils with or without a core material like iron can be adapted to every holding torque to be produced in a simple way both with respect to the local arrangement and the numerical arrangement.

Especially in case of external power supply failure the permanent magnets prevent the rotor and the motor shaft, respectively, from rotating due to the corresponding holding torque, thereby also preventing a displacement of the corresponding control device. This reliably prevents a situation where for example in the case of a valve, a gate valve, a blow-out preventer or the like as the control device an uncontrolled displacement of the control device takes place. This should particularly be avoided when such control devices are used in oil or gas production so as to prevent, for example, an uncontrolled opening of a conveying line upon corresponding pressure application by the conveying medium. The coil with or without the core are usable when there is an external power supply.

This means that even in a powerless state of the electric motor the permanent magnets of the position holding device prevent a displacement of the electric motor and thus e.g. an opening of the control device. The corresponding electric motors may be linear motors, torque motors, or other electric motors. It turns out to be of advantage in the case of torque motors that these can be easily used especially for the above-described purpose of use as they have a high torque at relatively low rotational speeds. Moreover, torque motors are direct motors that can directly be mounted on the motor shaft without an intermediate member. Such a torque motor can be regarded in a simplified form as a large servo motor with a hollow rotor. In the corresponding electric motor, the stator, for instance, serves to produce a corresponding rotary field while the rotor is equipped with permanent magnets.

The use of permanent magnets in the position holding device is somewhat disadvantageous in that upon rotation of the motor shaft and with a corresponding power supply the electric motor must also overcome the corresponding holding torque of the position holding device. To eliminate this drawback, a respective electrical compensation coil may be assigned at least to a number of permanent magnets. The coil is controlled such that it produces a magnetic field of opposite polarity relative to the magnetic field of the corresponding permanent magnet, thereby compensating for the same at least in part or also completely. Since normally the electrical compensation coil can only be used with a corresponding electrical supply of the electric motor, it is ensured on the one hand that upon failure of such a supply the corresponding holding torque of the position holding device is unrestrictedly applied while with a corresponding supply of the electric motor and excitation of the compensation coils the magnetic field of the corresponding permanent magnets is reduced, at least considerably, whereby the holding torque is also reduced considerably. As a result, the electric motor need not overcome such a holding torque or only overcome it to a minor extent.

To be able to arrange the compensation coil in this connection in a simple way, the coil may be wound onto the associated permanent magnet.

In principle, it might be enough to switch the compensation coil on or off, depending on the supply of the electric motor. This means that e.g. when the electric motor is energized the compensation coils are in use. However, it may turn out to be advantageous when the electrical compensation coils are not just switchable on and off, but are connected to a control device for controlling their magnetic fields. With such a control device it is e.g. possible to excite the corresponding compensation coil also during movement of the electric motor in a specific way. This may e.g. serve a fine adjustment of the speed, to realize specific braking or accelerating curves of the electric motor, or also to increase the holding torque of the position holding device by changing the polarity of the magnetic field of the compensation coils accordingly. To this end the compensation coils may be fed accordingly by a battery, an accumulator or, however, by the standard power supply of the electric motor.

It is self-evident that in this context only a few or even only one of the compensation coils is excited in a corresponding way by the control device so as to permit the above-mentioned control operations.

The corresponding stator of the electric motor may have a number of pole shoes, and an advantageous arrangement of the permanent magnets may be seen in the present context in the arrangement of said magnets in the circumferential direction of the stator between the pole shoes thereof.

In relation with the rotor the corresponding number of the permanent magnets may e.g. be arranged in linear fashion in the longitudinal direction thereof and/or distributed in circumferential direction of the rotor and particularly equally spaced apart. The arrangement may here also be provided on the inside of the stator.

However, it is also possible to provide arrangements of permanent magnets at one or both ends of the rotor and the stator, respectively, where e.g. pole shoes need no longer be present. This offers particularly the possibility of arranging the corresponding permanent magnets in the circumferential direction of the rotor also on the inside of the stator without any restrictions by pole shoes.

The arrangement of the permanent magnets may here be of a ring-like type in one, two or more rings on the inside of the stator.

Also conceivable is an arrangement or assignment of permanent magnets relative to a rotor or armature extension which laterally protrudes from the rotor. To simplify the arrangement of the permanent magnets in this connection, the rotor or armature extension may have assigned thereto a stator extension which can particularly be flanged onto the stator and is substantially sleeve-shaped and which comprises the permanent magnets on its inside. In conformity with the above explanations the arrangement of the permanent magnets may be of a linear and/or radial type or also in circumferential direction.

To use only a small number of permanent magnets for providing an adequate holding torque, each permanent magnet can be made from a material based on rare earths, possibly with additions such as iron, cobalt, boron, or the like. Such rare earth magnets (RE magnets) are distinguished by a high magnetic field strength in conjunction with very small dimensions. Moreover, such RE magnets exhibit a great coercive field strength and are therefore also useable in the case of high counter-fields without any problems. At the same time they exhibit a high temperature stability.

Examples of such RE magnets are neodym-iron-boron or samarium-cobalt magnets.

The present invention also relates to a position holding device as such that can be used with a corresponding electric motor. To be more specific, the position holding device may be configured as a retrofit kit, so that it can be installed later into already existing electric motors.

Furthermore, attention must be paid in the case of the aforementioned actuating devices and corresponding control devices that not only one, but at least two electric motors are normally used for reasons of redundancy. With a corresponding configuration the position holding device according to the invention may be provided for only one of the electric motors. However, an arrangement of such a position holding device for each of the electric motors is again preferred for reasons of redundancy.

DRAWINGS

Advantageous embodiments of the present invention shall now be explained in more detail with reference to the figures attached in the drawings, of which:

DETAILED DESCRIPTION OF THE EMBODIMENTS

Figure 1:
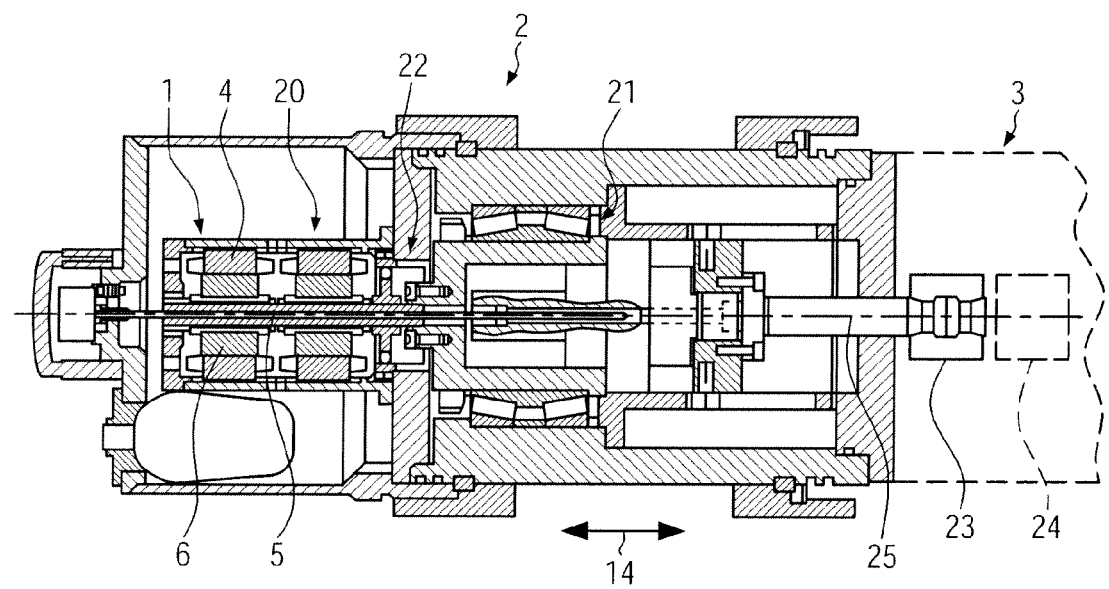
FIG. 1 is a longitudinal section through an actuating device with control device using two electric motors with position holding devices according to the present invention.

FIG. 1 shows a longitudinal section through the actuating device 2 which is laterally mounted on a control device 3, which is not shown in more detail. Such a control device 3 is e.g. a valve, a gate valve, a blow-out preventer, or the like. The corresponding control device can control the flow of crude oil or natural gas through a conveying line.

The control device 3 is connected by means of a piston rod 25 to a thread drive 21. Said drive, in turn, is operated through a motor shaft 5, optionally with interposition of a gear mechanism 22. The motor shaft 5 is connected to a rotor 6 of an electric motor 1, which also comprises an associated stator 4. For reasons of redundancy, at least two electric motors 1 and 20 are normally assigned to the motor shaft 5. The electric motors 1, 20 are of identical construction, so that reference will only be made hereinafter to the electric motor 1 with respect to a corresponding position holding device 7.

With a corresponding operation of the electric motor 1 and 20, respectively, the piston rod 25 is displaced between positions 23 and 24 and the corresponding control device 3 is thus also displaced via the piston rod 25 in longitudinal direction 14. One of positions 23 and 24, respectively, may correspond to a closed position of a corresponding conveying line.

The corresponding actuating device 2 comprises further components, which are here not described; as for their further description, reference is made to WO 2008/125136 A1.

Figure 2:
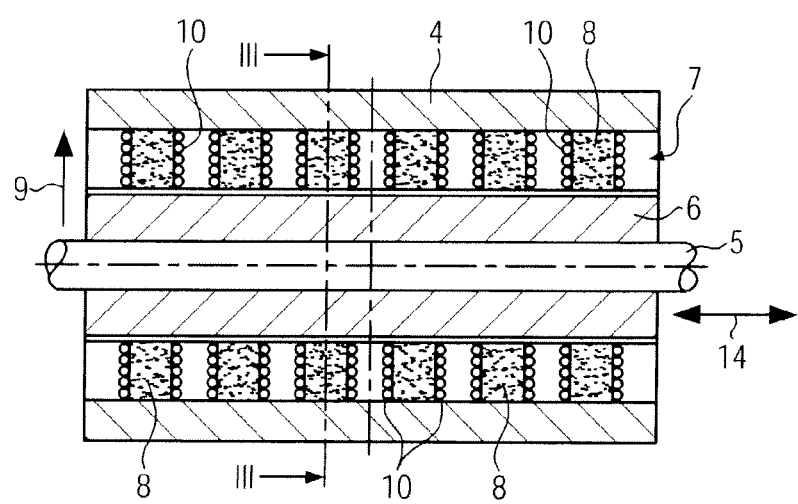
FIG. 2 is an enlarged longitudinal section through an electric motor according to FIG. 1 with further details.

FIG. 2 shows the electric motor 1 in longitudinal section on an enlarged scale and in part. A position holding device 7, in particular, can be seen that comprises a number of permanent magnets 8 and compensation coils 10 correspondingly wound onto said magnets. In the embodiment according to FIG. 2 the permanent magnets are linearly arranged in longitudinal direction 14, see also FIG. 3, with the permanent magnets being arranged in pairs in opposed relation to the rotor 6 on an inside of the stator 4. The permanent magnets are made from a material based on rare earths, optionally with additions such as iron, cobalt, boron, or the like. Examples of corresponding magnets are neodym-iron-boron and samarium-cobalt magnets.

Figure 3:
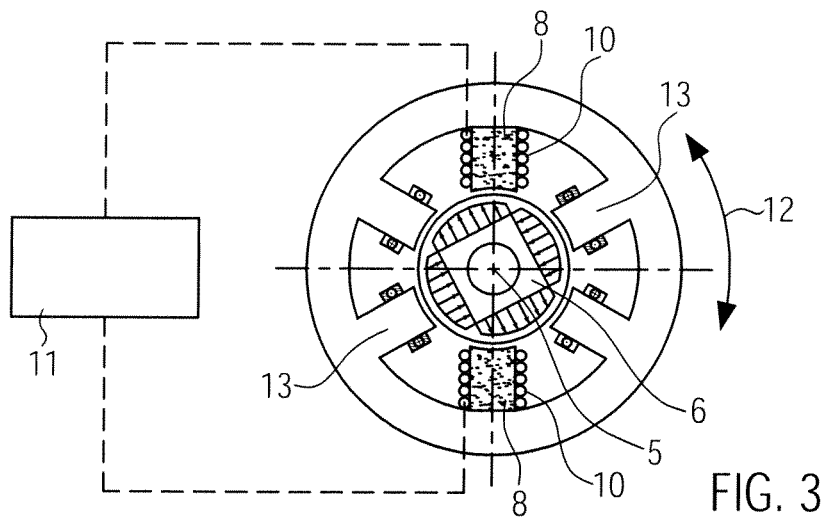
FIG. 3 is a section along line of FIG. 2.

The corresponding permanent magnets are each wrapped on their outside with a compensation coil 10, see also FIG. 3, with the coils being connected to a corresponding control device 11.

The permanent magnets are here arranged in radial direction 9 between rotor 6 and stator 4, the rotor 6 being configured as a hollow rotor and containing the corresponding motor shaft 5.

FIG. 3 is a section taken along line of FIG. 2. Apart from the corresponding permanent magnets with compensation coils 10, pole shoes 13 of the stator 4 are shown. These have also arranged thereon coils that serve to generate a rotary field through which the rotor equipped with permanent magnets is attracted or repelled accordingly, depending on the relative position.

In FIG. 3, the corresponding permanent magnets of the position holding device 7 are arranged diametrically opposite to each other on the inside of the stator 4. The permanent magnets 8, see FIG. 2, are arranged linearly in the longitudinal direction 14 of the stator one after the other, and all of the corresponding compensation coils 10 are connected to the control device 11. Said control device 11 serves to control the compensation coils and particularly the magnetic fields of said coils. The compensation coils can also be excited accordingly during use of the electric motor 1, e.g. to permit specific motion sequences of the electric motor, to realize specific braking or accelerating curves, to permit a fine adjustment of the rotational speed, or also to increase the holding torque generated by the permanent magnets. At least the compensation coils 10 are excited for offsetting and eliminating the magnetic field of the permanent magnets so as to prevent a situation where the electric motor upon its operation must also overcome the corresponding holding torque of the position holding device.

Figure 4:
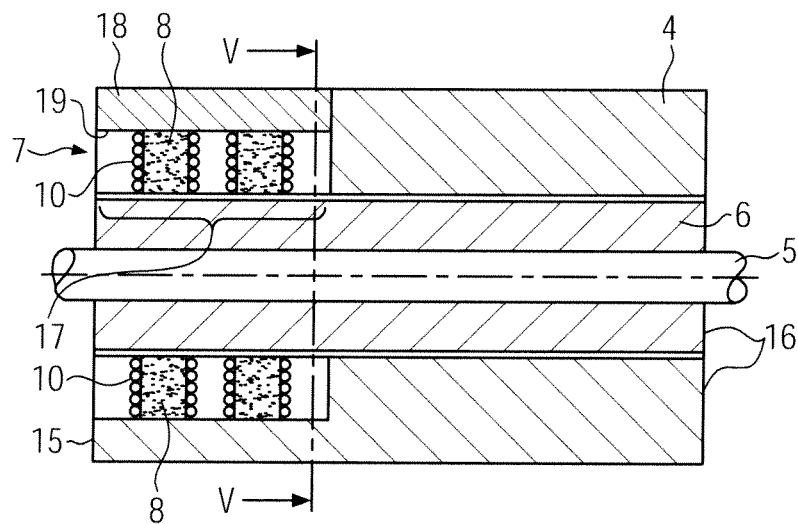
FIG. 4 is a longitudinal section by analogy with FIG. 2 through further embodiments according to the invention.

FIG. 4 is a longitudinal section by analogy with FIG. 2 through two further embodiments. The second embodiment is shown in the upper half of FIG. 4 and the third embodiment in the lower half of FIG. 4.

In the second embodiment the stator 4 does not extend over the whole length of the rotor 6, but the rotor 6 projects from the stator 4 with a corresponding rotor or armature extension 17. The position holding device 7 is arranged in the area of said extension 17. The construction of the position holding device 7 is analogous to FIGS. 2 and 3, i.e. the position holding device 7 comprises a number of permanent magnets 8 and corresponding compensation coils 10. In contrast to the arrangement shown in FIG. 2, the permanent magnets 8 are distributed in FIG. 4 in both embodiments in circumferential direction 12 of the stator 4 and the rotor 6, respectively, and are substantially equally spaced apart. For instance, two rings of permanent magnets 8 may be arranged in longitudinal direction 14 one after the other and each may comprise a plurality of permanent magnets arranged on the inside 19 of the stator and of a stator extension 18, respectively. This means that e.g. the permanent magnets 8 according to FIG. 4 are arranged by analogy with FIG. 3 and FIG. 5, respectively, but instead of corresponding pole shoes 13, permanent magnets 8 are also provided.

Figure 5:
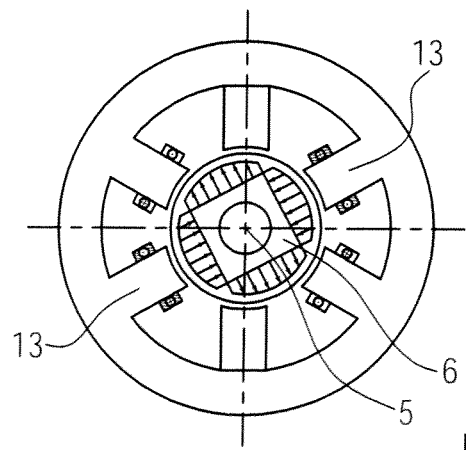
FIG. 5 is a section along line V-V of FIG. 4 by analogy with FIG. 3.

A corresponding control device 11 is not shown in FIGS. 4 and 5 for the sake of simplification.

In the second embodiment in the upper half of FIG. 2, the stator extension 18 is substantially provided in the form of a sleeve which can be flanged onto the end of the stator 4.

In the third embodiment, in the lower half of FIG. 2, the stator is now without a corresponding pole shoe 13 at its corresponding end 15, so that circumferentially distributed permanent magnets 8 are arranged in the corresponding interior between rotor 6 and stator 4.

A corresponding arrangement of permanent magnets 8 can substantially be provided at the other end 16 as well. This applies also to a corresponding extension 17 with accompanying stator extension 18. These may also be arranged at both ends 15 and 16 of rotor 6 and stator 4, respectively.

FIG. 5 shows a section taken along line V-V of FIG. 4. As can particularly be seen in this section, no permanent magnets 8 and associated compensation coils 10, respectively, are arranged outside the corresponding extension 17, so that the construction of the electric motor 1 outside said extension 17 is in conformity with the standard construction of the electric motor.

The corresponding position holding means 7 may also be designed as a retrofit kit so as to provide a corresponding electric motor with such a position holding device at a later time.

The position holding device 7 according to the invention and the electric motor 1, respectively, including such a position holding device, also provide a corresponding holding torque in case of failure of an electrical supply of the electric motor, said torque preventing a displacement of the motor shaft and thus of the thread drive 21 and of the control device 3, respectively. Such a displacement could be effected through a corresponding pressure application on the part of the control device 3 through conveying medium acting on the device. Such an automatic and uncontrolled displacement due to pressure actuation by the conveying medium might, however, cause an uncontrolled opening of the conveying line, through which the conveying medium might then unintentionally flow out in crude oil or natural gas production.

In the event of a power supply of the electric motor, and in order to prevent a situation where said motor must additionally be operated against the holding torque, the compensation coils 10 are provided, by which a magnetic field of opposite polarity with respect to the magnetic field of the permanent magnets is generated. As a result, the magnetic field of the permanent magnets can be substantially or fully compensated for.

However, according to the invention it is also conceivable to use the position holding device during operation of the electric motor, for instance, in order to control the motion sequence of the motor, to realize specific braking and accelerating curves of the motor, to permit a fine adjustment of the speed, or the like. Moreover, it is possible to increase the holding torque of the position holding device through the permanent magnets, in that e.g. the polarity of the compensation coils corresponds to the polarity of the permanent magnets through a corresponding driving of the control device. To this end, however, a corresponding power supply at least in the form of a battery or an accumulator is of advantage, by which in case of failure of the standard power supply the compensation coils can be operated.

As already mentioned above it is also possible to replace some or all of the permanent magnets by a coil with or without a core.

The invention claimed is:

1. An electric motor for an actuating device for displacing a control device, such as a valve, a gate valve, a blow-out preventer or the like, for use in oil or gas production, the electric motor comprising:
   a stator and a rotor assigned to a motor shaft, and a position holding device for exerting a holding torque on the motor shaft;
   wherein the position holding device comprises a plurality of permanent magnets and/or coils with or without a core material like iron, the permanent magnets and/or coils with or without a core material like iron being arranged in radial direction relative to the rotor and the motor shaft, respectively.

2. The electric motor according to claim 1, further comprising at least a plurality of permanent magnets each in electromagnetic communication with an electrical compensation coil.

3. The electric motor according to claim 2, wherein the electrical compensation coil is wound around the permanent magnet.

4. The electric motor according to claim 2, wherein the compensation coil is connected to a control device for controlling the magnetic field thereof.

5. The electric motor according to claim 2, wherein the stator comprises pole shoes and the permanent magnets are arranged in circumferential direction of the stator between the pole shoes.

6. The electric motor according to claim 1, further comprising a plurality of permanent magnets linearly arranged in longitudinal direction of the rotor and the motor shaft, respectively.

7. The electric motor according to claim 1, further comprising permanent magnets arranged distributed in circumferential direction of the stator and equally spaced apart.

8. The electric motor according to claim 1, further comprising permanent magnets arranged at one or both ends of the rotor and the stator.

9. The electric motor according to claim 1, further comprising permanent magnets arranged in pairs opposite each other relative to the rotor.

10. The electric motor according to claim 1, further comprising a rotor or armature extension projecting laterally from the stator and permanent magnets in magnetic communication with the rotor or armature extension.

11. The electric motor according to claim 10, further comprising a stator extension flanged onto the stator and substantially sleeve-shaped, the permanent magnets being arranged on the inside of the stator extension.

12. The electric motor according to claim 2, wherein the permanent magnets are made from materials based on rare earths, optionally with additions, such as iron, cobalt, boron, or the like.

13. A position holding device for an electric motor of an actuating device for displacing a control device, such as a valve, a gate valve, a blow-out preventer, or the like, for use in oil or gas production, wherein the electric motor comprises a stator and a rotor for rotating a motor shaft, the position holding device being capable of exerting a holding torque on the motor shaft and comprising a plurality of permanent magnets for exerting a corresponding holding force on the rotor or motor shaft, the permanent magnets being arranged in radial direction relative to the rotor.

14. The position holding device according to claim 13, the position holding device being configured as a retrofit kit.

* * * * *